US009485973B2

(12) United States Patent
Burke et al.

(10) Patent No.: US 9,485,973 B2
(45) Date of Patent: Nov. 8, 2016

(54) BAIT BRIDLE

(71) Applicants: James Byron Burke, Yaphank, NY (US); Dean Frank Delle Donne, Wading River, NY (US)

(72) Inventors: James Byron Burke, Yaphank, NY (US); Dean Frank Delle Donne, Wading River, NY (US)

( * ) Notice: Subject to any disclaimer, the term of this patent is extended or adjusted under 35 U.S.C. 154(b) by 390 days.

(21) Appl. No.: 13/938,193

(22) Filed: Jul. 9, 2013

(65) Prior Publication Data
US 2014/0013647 A1 Jan. 16, 2014

Related U.S. Application Data

(60) Provisional application No. 61/671,805, filed on Jul. 16, 2012.

(51) Int. Cl.
*A01K 83/06* (2006.01)

(52) U.S. Cl.
CPC .................................... *A01K 83/06* (2013.01)

(58) Field of Classification Search
CPC ........................................................ A01K 83/06
USPC .............. 43/44.8, 44.2, 44.4, 44.6; 24/599.9, 24/600.9, 601.1, 601.3, 601.4, 908, 572.1, 24/591.1, 592.1, 593.1, 594.1, 594.11, 24/595.1, 598.1, 598.2, 598.4, 601.7
See application file for complete search history.

(56) References Cited

U.S. PATENT DOCUMENTS

| 171,769 | A | * | 1/1876 | Buel | A01K 83/06 43/44.2 |
| 254,313 | A | * | 2/1882 | Hemming | A01K 83/06 43/44.8 |
| 472,962 | A | * | 4/1892 | Collins | F16B 45/02 24/601.3 |
| 580,915 | A | * | 4/1897 | Welch | A01K 83/06 43/44.2 |
| 608,348 | A | * | 8/1898 | Stadel | A01K 83/06 43/44.6 |
| 731,023 | A | * | 6/1903 | Cooper | A44B 13/0017 24/908 |
| 745,131 | A | * | 11/1903 | Abbath | A01K 91/04 43/44.83 |
| 772,333 | A | * | 10/1904 | Biersach | A01K 83/00 24/908 |

(Continued)

FOREIGN PATENT DOCUMENTS

| DE | 29602433 U1 | * | 5/1996 | ............. A01K 83/02 |
| DE | 10108148 A1 | * | 8/2002 | ............. A01K 83/06 |

(Continued)

OTHER PUBLICATIONS

Translation of DE 29602433.*

*Primary Examiner* — Darren W Ark
(74) *Attorney, Agent, or Firm* — Carter, DeLuca, Farrell & Schmidt, LLP

(57) ABSTRACT

A bait bridle is uniquely designed to connect a hook to bait while allowing the entire hook to be exposed for enhanced hooking capabilities and free movement of the bait. The addition of a small elastic band to the hook end of the bridle holds the hook firmly in place, yet allows easy removal when desired. The re-usable bridle system of the present invention can be switched from one hook to another hook with no damage to bait or the bridle. The bridle system of the present invention allows for free movement of the bait and full exposure of the hook. The bait bridle can be easily opened and closed to placement or removal of bait with the bridle on or off the hook.

7 Claims, 3 Drawing Sheets

(56) References Cited

U.S. PATENT DOCUMENTS

| | | | | |
|---|---|---|---|---|
| 843,651 A * | 2/1907 | Willing | A01K 93/00 | 43/44.2 |
| 863,272 A * | 8/1907 | Gebhardt | A01K 83/06 | 43/44.8 |
| 952,615 A * | 3/1910 | Harkins | A01K 91/04 | 24/908 |
| 1,182,471 A * | 5/1916 | Frost | A44B 15/00 | 43/44.83 |
| 1,325,530 A * | 12/1919 | Ore | A01K 83/00 | 43/44.8 |
| 1,351,669 A * | 8/1920 | Mansfield | A01K 85/10 | 24/908 |
| 1,461,246 A * | 7/1923 | Lent | A01K 83/06 | 43/44.2 |
| 1,728,560 A * | 9/1929 | Goshorn | A01K 91/04 | 43/44.83 |
| 1,779,343 A * | 10/1930 | Sylvanne | A01K 91/03 | 43/44.83 |
| 1,791,723 A * | 2/1931 | Hampton | A01K 83/06 | 43/44.8 |
| 1,899,790 A * | 2/1933 | Blum | A01K 83/06 | 43/44.2 |
| 2,094,267 A * | 9/1937 | Faria | A01K 83/00 | 43/44.83 |
| 2,148,074 A * | 2/1939 | Kaspick | A01K 83/02 | 43/44.8 |
| 2,150,074 A * | 3/1939 | McLure | A01K 91/04 | 24/908 |
| 2,173,750 A * | 9/1939 | Braconi | A01K 91/04 | 24/908 |
| 2,264,883 A * | 12/1941 | Lent | A01K 91/04 | 43/44.2 |
| 2,297,623 A * | 9/1942 | Hickman | A01K 65/00 | 24/708.5 |
| 2,354,848 A * | 8/1944 | Carpenter | A01K 65/00 | 24/708.8 |
| 2,430,115 A * | 11/1947 | Hickson | A01K 97/16 | 24/908 |
| 2,495,348 A * | 1/1950 | Roed | A01K 91/04 | 43/44.83 |
| 2,523,679 A * | 9/1950 | Caldwell | A01K 91/04 | 24/908 |
| 2,577,466 A * | 12/1951 | Jones | A01K 91/04 | 43/44.83 |
| 2,594,661 A * | 4/1952 | Lehmann | A01K 65/00 | 24/709.8 |
| 2,674,824 A * | 4/1954 | Werner | A01K 91/14 | 43/44.83 |
| 2,732,652 A * | 1/1956 | Parks | A01K 91/04 | 43/44.83 |
| 2,755,593 A * | 7/1956 | Thurman | A01K 83/06 | 43/44.2 |
| 2,756,478 A * | 7/1956 | Morrissey | A01K 91/03 | 24/601.1 |
| 2,814,086 A * | 11/1957 | Bahr | A01K 91/04 | 43/44.83 |
| 2,871,540 A * | 2/1959 | Smith | A01K 91/04 | 43/44.83 |
| 2,900,754 A * | 8/1959 | Orlik | A01K 83/06 | 43/44.2 |
| 2,922,247 A * | 1/1960 | Buss | A01K 83/00 | 43/44.8 |
| 2,938,296 A * | 5/1960 | Kracht | A01K 83/00 | 43/44.8 |
| 2,977,710 A * | 4/1961 | Stambaugh | A01K 83/06 | 43/44.2 |
| 2,982,049 A * | 5/1961 | Yost | A01K 83/06 | 43/44.8 |
| 3,004,319 A * | 10/1961 | Hennon | A01K 97/06 | 43/44.83 |
| 3,184,880 A * | 5/1965 | Ratte | A01K 91/04 | 24/908 |
| 3,193,965 A * | 7/1965 | Jacobsen | A01K 83/06 | 43/44.8 |
| 3,327,423 A * | 6/1967 | Kotis | A01K 83/06 | 43/44.2 |
| 3,354,523 A * | 11/1967 | Roche | A01K 91/04 | 24/908 |
| 3,382,602 A * | 5/1968 | Blake | A01K 83/02 | 43/44.6 |
| 3,600,838 A * | 8/1971 | Bablick | A01K 83/06 | 43/44.8 |
| 3,724,034 A * | 4/1973 | Osano | A01K 91/04 | 43/44.83 |
| D228,760 S * | 10/1973 | Hoog | D22/134 | |
| 3,879,886 A * | 4/1975 | Thomas | A01K 83/06 | 43/44.8 |
| 3,992,801 A * | 11/1976 | McDiarmid | A01K 83/06 | 43/44.8 |
| 4,064,604 A * | 12/1977 | Hartman | A01K 91/04 | 43/44.83 |
| 4,104,820 A * | 8/1978 | Bardebes | A01K 83/02 | 43/36 |
| 4,307,532 A * | 12/1981 | Hughs | A01K 83/06 | 43/44.4 |
| 4,349,979 A * | 9/1982 | Strantz | A01K 83/06 | 43/44.8 |
| 4,470,217 A * | 9/1984 | Adams | A01K 83/00 | 43/44.8 |
| 4,656,699 A * | 4/1987 | Maahs | A01K 91/04 | 24/601.3 |
| 4,696,120 A * | 9/1987 | Schroeder | A01K 91/04 | 43/44.83 |
| 4,719,717 A * | 1/1988 | Koestner | A01K 83/06 | 43/44.8 |
| 4,733,441 A * | 3/1988 | Buchanan | A01K 91/04 | 24/908 |
| 4,794,720 A * | 1/1989 | Robertaccio | A01K 85/00 | 43/43.6 |
| 4,947,575 A * | 8/1990 | Yerkovich | A01K 83/06 | 43/44.8 |
| 4,986,500 A * | 1/1991 | Campbell | F16L 3/01 | 24/301 |
| 5,117,575 A * | 6/1992 | Desmond | A01K 83/06 | 43/44.8 |
| 5,230,178 A * | 7/1993 | Dillard | A01K 83/06 | 43/44.8 |
| 5,617,668 A * | 4/1997 | Shimandle | A01K 83/06 | 43/44.8 |
| 5,655,329 A * | 8/1997 | Yong-Set | A01K 91/04 | 43/44.83 |
| 5,673,508 A * | 10/1997 | Snyder | A01K 85/00 | 43/44.8 |
| 5,781,972 A * | 7/1998 | Steed | A01K 91/04 | 43/44.83 |
| 5,855,089 A * | 1/1999 | Hockmeyer | A01K 85/00 | 43/43.6 |
| 5,890,317 A * | 4/1999 | Hollomon | A01K 85/00 | 43/44.8 |
| 6,141,839 A * | 11/2000 | Yong-Set | A01K 91/04 | 24/601.8 |
| 7,481,019 B2 * | 1/2009 | Rosenberg | A01K 83/06 | 43/44.8 |
| 7,832,139 B1 * | 11/2010 | Christensen | A01K 91/06 | 24/908 |
| 7,971,387 B2 * | 7/2011 | Huddleston | A01K 85/00 | 43/44.8 |
| 7,980,021 B2 * | 7/2011 | Siatkowski | A01K 83/06 | 43/44.8 |
| 8,167,251 B2 * | 5/2012 | Murphy | B61G 5/06 | 24/908 |
| 8,201,779 B2 * | 6/2012 | Hua | F16L 3/14 | 24/908 |
| 8,276,853 B2 * | 10/2012 | Murphy | B61G 5/06 | 24/908 |
| 8,695,180 B2 * | 4/2014 | Delle Donne | A01K 91/04 | 24/908 |
| 2005/0044772 A1 * | 3/2005 | Lillard, II | A01K 83/06 | 43/44.6 |
| 2012/0216443 A1 * | 8/2012 | Merritt | A01K 95/00 | 43/44.81 |
| 2013/0145674 A1 * | 6/2013 | Nichols | A01K 85/00 | 43/42.36 |

(56) References Cited

U.S. PATENT DOCUMENTS

| | | | | |
|---|---|---|---|---|
| 2014/0259867 A1* | 9/2014 | Scholfield | ............ | A01K 85/01 43/44.8 |
| 2014/0259869 A1* | 9/2014 | Scholfield | ............ | A01K 83/06 43/42.39 |

FOREIGN PATENT DOCUMENTS

| | | | | | | |
|---|---|---|---|---|---|---|
| ES | 1541020 | A1 | * | 6/2005 | ............ | A01K 83/06 |
| FR | 955655 | A | * | 1/1950 | ............ | A01K 83/06 |
| FR | 1056976 | A | * | 3/1954 | ............ | A01K 83/06 |
| FR | 1129128 | A | * | 1/1957 | ............ | A01K 83/06 |
| FR | 2185354 | A1 | * | 1/1974 | ............ | A01K 83/00 |
| FR | 2721797 | A1 | * | 1/1996 | ............ | A01K 83/06 |
| FR | 2790361 | A1 | * | 9/2000 | ............ | A01K 83/06 |
| FR | 2840156 | A1 | * | 12/2003 | ............ | A01K 83/06 |
| GB | 212181 | A | * | 3/1924 | ............ | A01K 83/06 |
| GB | 2241419 | A | * | 9/1991 | ............ | A01K 83/06 |
| GB | 2378113 | A | * | 2/2003 | ............ | A01K 97/04 |
| GB | 2388289 | A | * | 11/2003 | ............ | A01K 83/06 |
| GB | 2410880 | A | * | 8/2005 | ............ | A01K 83/06 |
| GB | 2471341 | B | * | 10/2013 | ............ | A01K 83/06 |
| GB | 2512995 | A | * | 10/2014 | ............ | A01K 83/06 |
| NL | GB 2492818 | B | * | 3/2014 | ............ | A01K 83/06 |
| RU | 2005368 | C1 | * | 1/1994 | ............ | A01K 83/06 |
| WO | WO 9807312 | A1 | * | 2/1998 | ............ | A01K 83/06 |

* cited by examiner

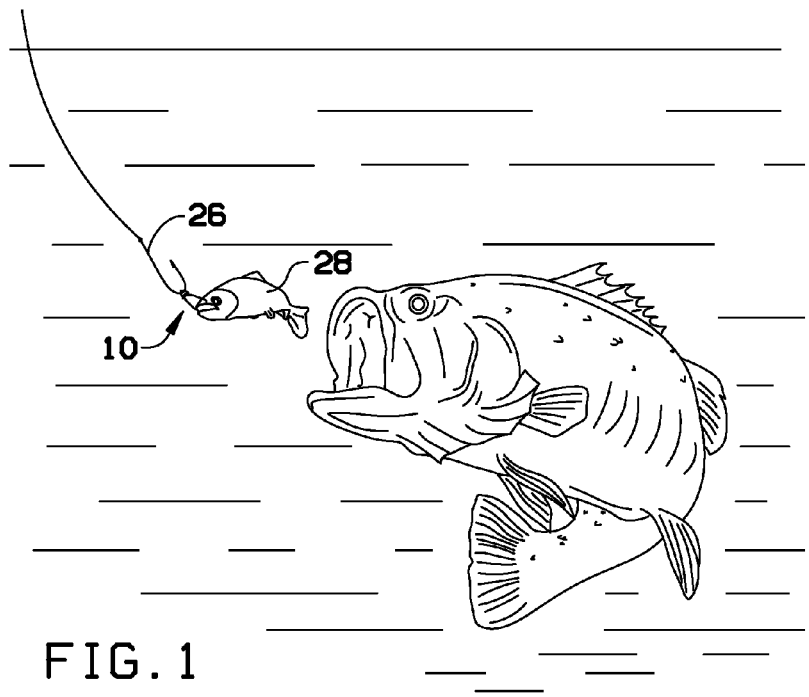
FIG.1
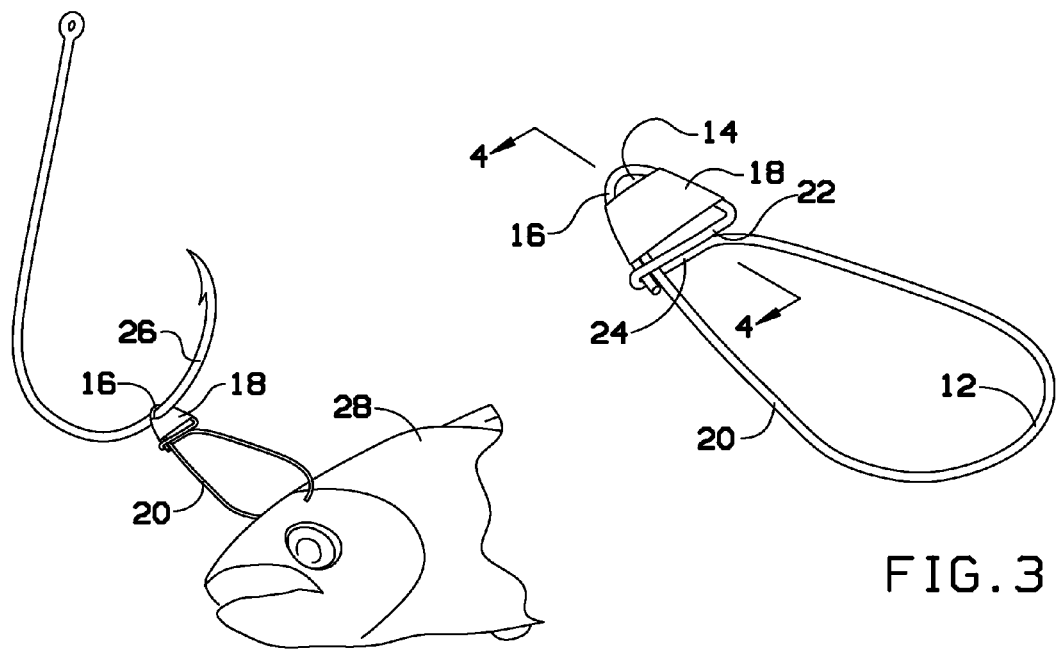
FIG.2
FIG.3

BAIT BRIDLE

CROSS-REFERENCE TO RELATED APPLICATION

This application claims the benefit of priority of U.S. provisional application No. 61/671,805, filed Jul. 12, 2012, the contents of which are herein incorporated by reference.

BACKGROUND OF THE INVENTION

The present invention relates to fishing accessories and, more particularly, to a reusable wire clip device that attaches bait to a fishing hook.

There is a diminished fish hooking ability when using a fishing hook, especially a circle hook, directly attached to bait.

Conventional bait bridles can only be used once, require tools to place, are complicated to use and often fail to attach the hook firmly to the bait. Tools can complicate the attachment process and the ability to easily remove and reuse a bridle is important. Most existing bridles are either damaged or damage the bait upon their removal.

As can be seen, there is a need for an improved bait bridle that is reusable, easily placed, is simple to use and firmly attach the hook to the fishing bait.

SUMMARY OF THE INVENTION

In one aspect of the present invention, a bait bridle comprises a loop section having a locking bend and a wire extending therefrom, the locking bend formed from a lock slot top wire and a lock slot bottom wire; a bait loop formed by the wire, where the end of the bait loop removably fits into the locking bend of the loop section; and an elastic band fitting over the loop section, wherein the elastic band secures the bait bridle to a hook inserted into a fish hook slot formed between the loop section and the elastic band.

In another aspect of the present invention, a bait bridle formed from a single piece of wire comprises a loop section having a locking bend and a wire extending therefrom, the locking bend formed from a lock slot top wire and a lock slot bottom wire; a bait loop formed by the wire, where the end of the bait loop removably and resiliently fits into the locking bend of the loop section; and an elastic band fitting over the loop section, wherein the elastic band secures the bait bridle to a hook inserted into a fish hook slot formed between the loop section and the elastic band, wherein the loop section is formed in a cone shape, with the fish hook slot formed at a peak of the cone shape.

In a further aspect of the present invention, a method for baiting a hook with a bait bridle comprises positioning an elastic band, disposed on a loop section of the bait bridle, to open a fish hook slot at an end of the loop section, the loop section having a locking bend and a wire extending therefrom, the locking bend formed from a lock slot top wire and a lock slot bottom wire; inserting the hook into the fish hook slot; releasing the elastic band to cause the elastic band to resiliently press against the hook to secure the bait bridle to the hook; opening a bait retainer portion of the bait bridle by resiliently removing a bridle lock wire from the locking bend; placing bait on the bait retainer portion; and closing the bait retainer portion by positioning the bridle lock wire into the locking bend.

These and other features, aspects and advantages of the present invention will become better understood with reference to the following drawings, description and claims.

BRIEF DESCRIPTION OF THE DRAWINGS

FIG. 1 is a perspective view of a bait bridle, in use to catch a fish, according to an exemplary embodiment of the present invention;

FIG. 2 is a detailed perspective view of the bait bridle of FIG. 1, illustrated attached to a hook and with bait attached;

FIG. 3 is a perspective view of the bait bridle of FIG. 1;

DETAILED DESCRIPTION OF THE INVENTION

Figure 4:
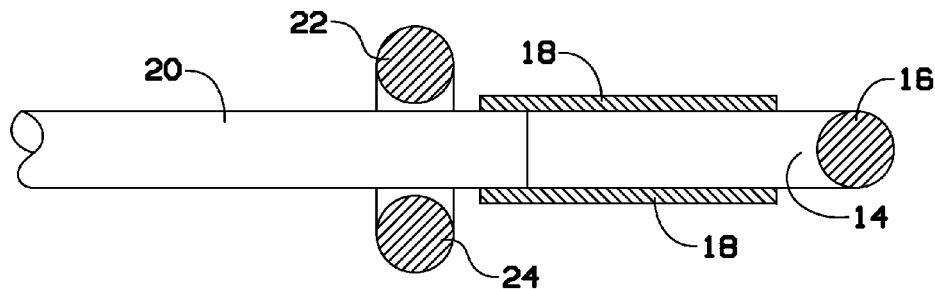
FIG. 4 is a cross-sectional view taken along line 4-4 of FIG. 3.
Figure 5:
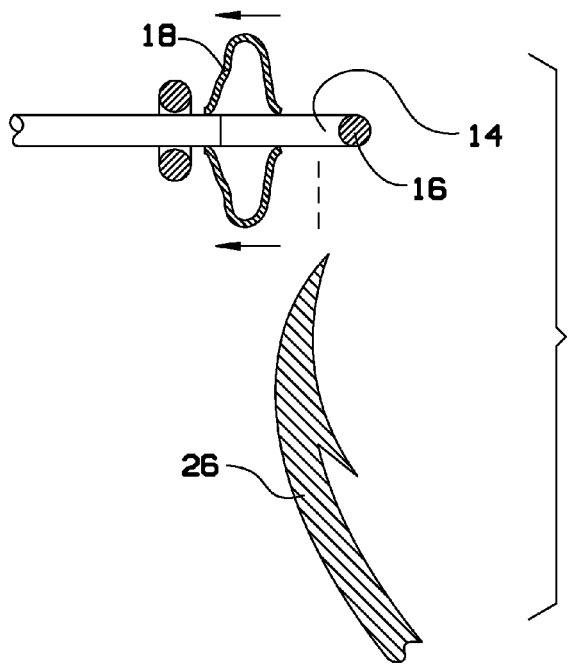
FIG. 5 is a cross-sectional view, as taken along line 4-4 of FIG. 3, illustrating movement of an elastic band for insertion of a hook.
Figure 6:
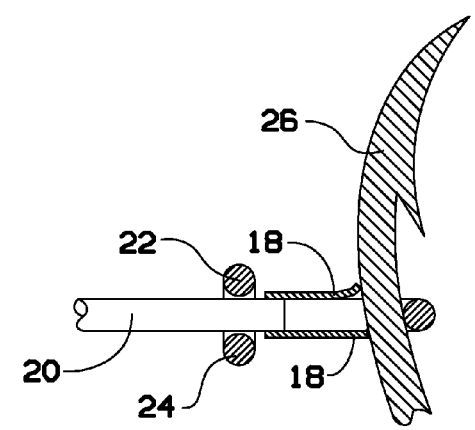
FIG. 6 is a cross-sectional view, as taken along line 4-4 of FIG. 3, illustrating attachment of the hook to the bait bridle.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a bait bridle that is uniquely designed to connect a hook to bait while allowing the entire hook to be exposed for enhanced hooking capabilities and free movement of the bait. The addition of a small elastic band to the hook end of the bridle holds the hook firmly in place, yet allows easy removal when desired. The re-usable bridle system of the present invention can be switched from one hook to another hook with no damage to bait or the bridle. The bridle system of the present invention allows for free movement of the bait and full exposure of the hook. The bait bridle can be easily opened and closed to placement or removal of bait with the bridle on or off the hook.

Referring now to FIGS. 1 through 9, a bait bridle 10 (also referred to as a bridle 10) can be formed from a single piece of wire, such as stainless steel 200 pound test wire or stainless spring wire. The wire can be bent to include a small loop 16 formed on a first end of the bridle 10 and a bait retainer loop 12 formed on a second, opposite end of the bridle 10.

An elastic band 18 can be formed around at least a portion of the small loop 16. A fish hook slot 14 can be formed between the elastic band 18 and the end of the small loop 16. The elastic band 18 can be formed of various flexible materials, such as s rubber band, surgical tubing, or the like, and may be sized to fit snuggly onto the small loop 16. The elastic band 18 can provide sufficient pressure against the hook 26 to securely hold the bridle 10 in place while maintaining free movement of the bait 28. Additionally, as illustrated in FIG. 3, the elastic band 18 provides a method to remove bridle 10 from the hook 26 by applying pressure to the bridle 10, compressing the elastic band 18, and sliding the bridle 10 over the hook barb. The small loop 16 can be formed in a cone shape. This small loop 16, in conjunction with the elastic band 18, continues a secure attachment of the bridle 10 to the hook 26 in the event that the elastic band 18 may have a tendency to become slippery when wet. The cone shape of the small loop 16 takes advantage of this occurrence since the elastic band 18 would naturally move from the wider area to the narrower of the bridle 10. Therefore, with the fish hook slot 14 at the narrow end of the small loop 16 cone shape, should the elastic band 18 slip, this only better secures the hook 26 to the small loop 16.

Figure 7:
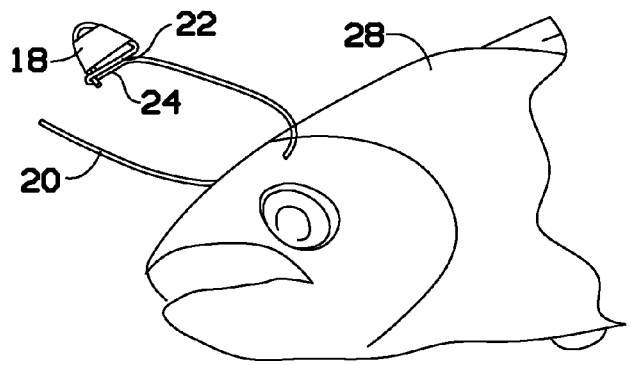
FIG. 7 is a perspective view of the bait bridle of FIG. 1, with bait attached thereto, illustrating a first step in connecting the baited bridle.
Figure 8:
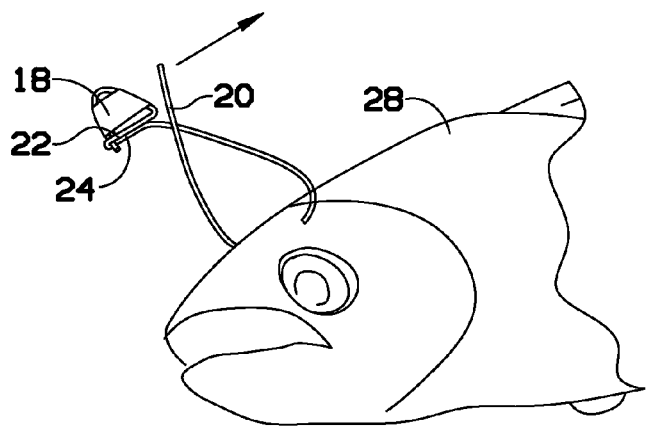
FIG. 8 is a perspective view of the bait bridle of FIG. 1, with bait attached thereto, illustrating a second step in connecting the baited bridle.
Figure 9:
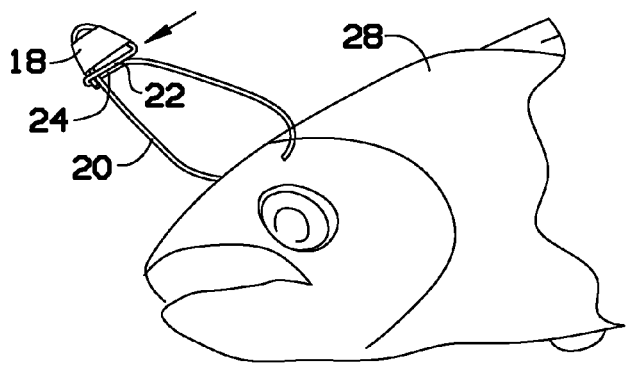
FIG. 9 is a perspective view of the bait bridle of FIG. 1, with bait attached thereto, illustrating a third step in connecting the baited bridle.

After forming the small loop 16, the wire of the bridle 10 bends into a locking bend formed from a lock slot top wire 22 and a lock slot bottom wire 24 (together, with lock slot wires 22, 24 form a bottom of the cone-shaped small loop 16 and wrap around the wire of the bridle 10). A bridle lock wire 20 can be removably inserted into the slot formed by the lock slot wires 22, 24. FIGS. 7 through 9 show the insertion of the bridle lock wire 20 into the slot to secure the bait 28 on the bait retainer 12 of the bridle 10.

At the hook placement through the fish hook slot 14, the wire design not only supports a variety of sizes of hooks 26, but also provides an interlocking, wire against wire design that provides additional strength to prevent failure under extreme pressure.

The above-designed bait bridle provides a more natural movement of the bait without diminishing hook ability.

To use the bait bridle 10 of the present invention, the bridle 10 can be held in one hand while holding the elastic band 18 away from the bend in the small loop 16. The hook point can be placed through the fish hook slot 14 created. The elastic band 18 can be released to secure the bridle 10 to the hook 26. If the bridle 10 is closed, the user can open the bridle lock by pressing the end of the bridle lock wire 20 past the locking bend (formed by the lock slot top wire 22 and the lock slot bottom wire 24). Bait 28 can be selected and the open end of the bridle 10 can penetrate the bait 28. The bridle 10 can be positioned on the hook shank as desired and the unit is ready for fishing.

It should be understood, of course, that the foregoing relates to exemplary embodiments of the invention and that modifications may be made without departing from the spirit and scope of the invention as set forth in the following claims.

What is claimed is:

1. A bait bridle, comprising:
a hook loop defining a cone shape narrowing in width from a base to an apex thereof;
a locking portion formed by a top wire and a bottom wire, the top and bottom wires extending across a width of the base of the hook loop to define the base of the hook loop;
a bait loop extending from the locking portion, the bait loop configured to attach to a piece of bait, wherein a single piece of wire integrally forms the hook loop, the locking portion, and the bait loop; and
an elastic band disposed about the hook loop so as to define a hook slot between the apex of the hook loop and the elastic band, the elastic band disposed about the hook loop in an expanded, tensioned state such that the elastic band is urged towards the apex of the hook loop under bias of the elastic band towards a contracted, un-tensioned state, wherein the bias of the elastic band is configured to secure a fish hook received within the hook slot between the apex of the hook loop and the elastic band.

2. The bait bridle of claim 1, wherein a free end of the bait loop is configured for releasable receipt within the locking portion.

3. The bait bridle of claim 1, wherein the single piece of wire is stainless spring steel.

4. A bridle comprising:
a first loop section defining a cone shape narrowing in width from a base to an apex thereof;
a locking bend formed by a top wire and a bottom wire, the top and bottom wires extending across a width of the base of the first loop section to define the base of the first loop section;
a second loop section extending from the locking bend opposite the first loop section, the second loop section defining an end;
a bridle lock disposed at the end of the second loop section, the bridle lock resiliently removable from the locking bend, wherein a single piece of wire integrally forms the first loop section, the locking bend, the second loop section, and the bridle lock; and
an elastic band disposed about the first loop section so as to define a slot between the apex of the first loop section and the elastic band, the elastic band disposed about the first loop section in an expanded, tensioned state such that the elastic band is urged towards the apex of the first loop section under bias of the elastic band towards a contracted, un-tensioned state, wherein the bias of the elastic band is configured to secure a component inserted through the slot in position between the apex of the first loop section and the elastic band.

5. The bridle of claim 4, wherein the single piece of wire is stainless spring steel.

6. A system, comprising:
a fish hook; and
a bait bridle, including:
a hook loop narrowing in width from a base to an apex thereof;
a locking bend formed by a top wire and a bottom wire, the top and bottom wires extending across a width of the base of the hook loop to define the base of the hook loop;
a bait loop extending from the locking bend and configured to attach to a piece of bait, wherein a single piece of wire integrally forms the hook loop, the locking bend, and the bait loop; and
an elastic band disposed about the hook loop so as to define a hook slot between the apex of the hook loop and the elastic band, the elastic band disposed about the hook loop in an expanded, tensioned state such that the elastic band is urged towards the apex of the hook loop under bias of the elastic band towards a contracted, un-tensioned state,
wherein the fish hook extends through the hook slot, and
wherein the bias of the elastic band secures the fish hook between the apex of the hook loop and the elastic band.

7. The system according to claim 6, wherein the single piece of wire is stainless spring steel.

\* \* \* \* \*